United States Patent [19]
Leiber

[11] Patent Number: 4,585,280
[45] Date of Patent: Apr. 29, 1986

[54] METHOD AND SYSTEM OF CONTROLLING BRAKING PRESSURE IN A VEHICLE BRAKE

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 582,936

[22] Filed: Feb. 23, 1984

[30] Foreign Application Priority Data

Feb. 26, 1983 [DE]  Fed. Rep. of Germany ....... 3303916

[51] Int. Cl.$^4$ ........................... B60T 8/70; B60T 8/64
[52] U.S. Cl. .................................... 303/100; 303/110; 303/DIG. 4; 303/105
[58] Field of Search ............... 303/95, 96, 97, 104, 303/105, 106, 107, 108, 109, 110, 111, 119; 188/181 A, 181 C; 364/426

[56] References Cited

U.S. PATENT DOCUMENTS

| | | | |
|---|---|---|---|
| 3,556,610 | 1/1971 | Leiber | 303/106 |
| 3,674,318 | 7/1972 | Hickner et al. | 303/97 |
| 3,705,748 | 12/1972 | Ochiai | 303/109 |
| 3,847,449 | 11/1974 | Adahan | 188/181 A |
| 3,888,550 | 6/1975 | Reinecke et al. | 303/20 |
| 4,054,328 | 10/1977 | Leiber et al. | 303/103 |
| 4,357,054 | 11/1982 | Leiber | 303/92 |

Primary Examiner—Duane A. Reger
Assistant Examiner—Alvin Oberley
Attorney, Agent, or Firm—Frishauf, Holtz, Goodman & Woodward

[57] ABSTRACT

To prevent oscillation of a wheel being intermittently braked in an anti-slip or anti wheel block system, an increase of braking pressure, after a prior decrease, is controlled to occur during a first time interval which is short with respect to an oscillation period of the wheel if subjected to brake pressure pulses, so that the braking pressure increase will be small or short, e.g. about 3 milliseconds, comparable to stepped pressure increases after an initial wheel deceleration and permitted re-acceleration, the pressure then being maintained at an even level for an interval ($T_3$) which, likewise, is short with respect to the intervals ($T_0$, $T_4$) between stepped increases. The respective time intervals can be controlled by individual, special pulse generators, or by suitable programming of microprocessor elements.

20 Claims, 4 Drawing Figures

METHOD AND SYSTEM OF CONTROLLING BRAKING PRESSURE IN A VEHICLE BRAKE

Reference to related patents, the disclosure of which is hereby incorporated by reference: U.S. Pat. No. 3,888,550, U.S. Pat. No. 4,054,328.

The present invention relates to vehicle brake control systems, and to a method of controlling vehicle brakes, and more particularly to brakes using a compressed fluid, for example hydraulic fluid, which are installed in a system which prevents blocking of wheels upon application of braking pressure.

BACKGROUND

Various types of anti wheel blocking braking systems are known. Usually, such systems include transducers coupled to the wheels which provide output signals representative of speed of the wheel which are applied to suitable evaluation circuits and which process the signals, for example to obtain vehicle acceleration or deceleration signals, rate of change of acceleration/deceleration, and the like; the evaluation circuit then provides control signals applied to valves which, selectively, apply pressurized brake fluid to the wheel brake cylinders, drain pressurized brake fluid therefrom, or maintain a predetermined braking pressure by blocking both admission as well as drainage of brake fluid from the cylinders, once pressurized brake fluid has been applied thereto. Some systems of this type utilize control apparatus which provides change in braking pressure in steps, for example by pulses which, in pulsed intervals, increases the braking pressure.

Circuits and evaluation signals of this type are known, see, for example, the referenced U.S. Pat. Nos. 3,888,550 and 4,054,328. In accordance with the arrangement there disclosed, braking pressure is first applied, and, if the wheel tends to block, a relief of braking pressure is then commanded. After relief of braking pressure, that is, drop of braking pressure, a certain braking pressure may be maintained and then, again, increase gradually. The rate of increase of braking pressure, after a drop, and subsequent maintenance of braking pressure may be in accordance with a gradient or rate of change which is smaller than the initial braking pressure build-up.

Various circuits may be used to carry out the transfer functions desired between commanded braking pressure and desirable braking pressure in the light of vehicle characteristics and a predetermined program of build-up, relief, and/or maintenance of braking pressure. For example, in accordance with the disclosure of the referenced patents, a control pulse is generated which causes rapid increase of braking pressure, to be followed by a sequence of suitably arranged pulses which result in further increase of braking pressure at a lower rate, however, since there will be gaps between the pulses during which the braking pressure is maintained. In accordance with U.S. Pat. No. 3,888,550 a fixed timing interval is controlled, for example by a timing circuit which provides for a fixed time interval, which commands rapid increase of braking pressure. In U.S. Pat. No. 4,054,328, the rapid increase of braking pressure is made dependent on the degree of a prior build-up of braking pressure in a prior control cycle. The purpose, of course, is to optimize the increase in braking pressure and thus to optimize the overall braking effect to be obtained by the system.

THE INVENTION

It is an object to improve automatic brake anti-lock or anti-skid systems, and particularly to avoid possible vibrations or oscillations which might arise under some conditions if the braking cycles or sequences as previously proposed are carried out.

The invention is based on the discovery that, upon change in braking pressure after an initial rise and subsequent drop, and consequent acceleration of a previously strongly braked wheel, the wheel may undergo speed or acceleration/deceleration oscillations if stepped rise and drop in braking pressure is again commanded. Briefly, therefore, and in contrast to the prior solutions to prevent blocking of wheels, and hence skidding of a vehicle, a control pulse is generated which, after previous braking, controls the braking system to build up braking pressure only to a small extent, smaller than heretofore used, to be followed by a short pressure maintenance period, and only then to be followed by a further rise in braking pressure. The basis for this method is the discovery that a comparatively control pulse, resulting in a comparatively large increase in braking effort applied to any wheel—after the wheel has already excessively decelerated—may lead to an oscillatory sequence, particularly if the construction of the wheel, and the suspension thereof, is soft, and/or the wheel and the associated axle have compartively little inertia.

DRAWINGS

DETAILED DESCRIPTION.

Figure 1:
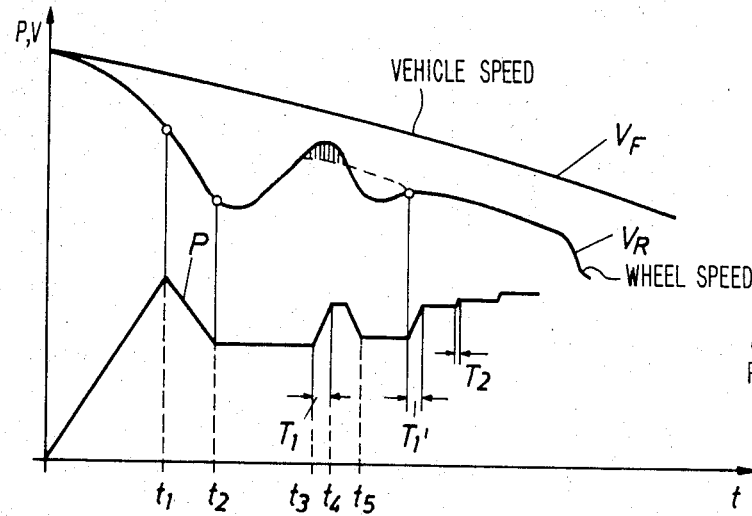
FIG. 1 is a pressure and speed diagram, with respect to time, illustrating anti-skid braking control in accordance with the prior art.

The operation of an anti-skid or anti-brake lock system in accordance with the prior art is shown in FIG. 1, which will be explained in detail since, then, the improvement effected by the present invention will be clear. The ordinate represents, respectively, speed or pressure, in accordance with the speed or pressure curves shown in the Figure, speed and pressure varying with respect to the time axis of the abscissa. The axes of FIG. 2 represent the same parameters.

The curve $V_F$ represents vehicle speed, which is dropping smoothly as braking is controlled. The curve $V_R$ represents the speed of an individual wheel which is controlled by the anti-skid or anti-block system. It is assumed that the vehicle in which the system is installed has a suspension construction such that the axles and wheels have low mass, and that the suspension is highly elastic, specifically longitudinally highly elastic. Upon increase of braking pressure subsequent to a deceleration/acceleration cycle of the wheel, oscillations may result as shown in the full-line position of wheel speed. The desired wheel speed curve is, however, in accordance with the broken-line portion of FIG. 1. As best seen in FIG. 1, the braking pressure is first increased up to a time $t_1$, and then a drainage valve is controlled to permit a decrease in braking pressure, see curve P, time period $t_1$ to $t_2$. Thereafter, a constant brake pressure maintenance period is commanded, time period $t_2$ to $t_3$. When the wheel has accelerated to a predetermined level, or after a predetermined period of time, in accordance with the system which is selected, the braking pressure is again increased during a time interval $T_1$ which corresponds to the time period $t_3$ to $t_4$. The time period $T_1$ is relatively long, and since the available pressure from a hydraulic or other fluid pressure source continues to be available at a level higher than that of the braking pressure P, the braking pressure P in the specific wheel will rise rapidly. This causes a deceleration of the wheel which, then, will again trigger a decrease in braking effort, see drop of braking pressure P to the time period $t_5$. The actually required pressure increase will only occur subsequently, that is, after time $t_5$, see time period $T_1'$, and subsequent stepped pressure increases, see $T_2$. As can be clearly seen from FIG. 1, the pressure increase is in steps $T_2$ which are followed, each, by pressure maintenance phases so that the effective pressure increase, over a period of time, will be slow and gradual—see portion of curves beyond $T_2$.

Figure 2:
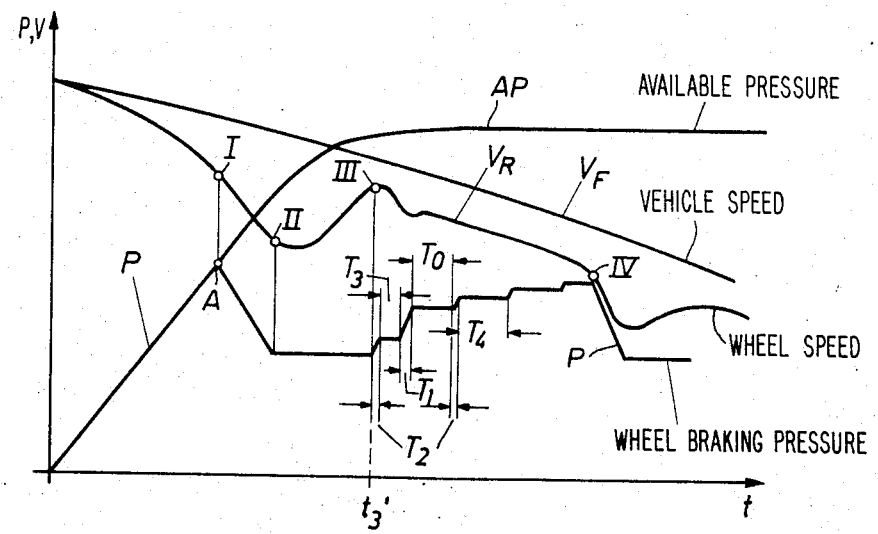
FIG. 2 is a diagram similar to FIG. 1, illustrating control in accordance with the present invention.

In accordance with the present invention—see FIG. 2—the pressure increase after period $t_3$ is much less than heretofore used, see FIG. 2, time period $t_3'$. The available pressure is shown in FIG. 2. Up to point A, that is, initial application of braking pressure to the wheel, the available and wheel pressure will be the same. The available pressure, for example from a hydraulic pressure reservoir, will then be disconnected, and the pressure of the fluid applied to the wheel will follow the curve P from point A.

In accordance with the present invention, thus, and starting at the time period $t_3'$, pressure is first raised only for a very short time interval $T_2$, to be followed by a pressure maintenance period $T_3$. Only after the initial small pressure rise during time $T_2$ and the subsequent maintenance phase $T_3$, will the greater or more extensive pressure rise follow, as shown by the time $T_1$. The pressure rise $T_1$ may correspond to that of $T_1$, or $T_1'$ of FIG. 1, or be slightly less. The pressure maintenance time $T_0$, preferably, is longer than the time gap between time $t_5$ (FIG. 1) and the subsequent pressure rise, $T_1'$.

In the system of the present invention, see FIG. 2, the time $T_0$ is then followed by small stepped pressure rises, see time $T_2$ and subsequent pressure maintenance phases or time periods $T_4$. The behavior of the wheel will be different from that shown in FIG. 1, and, as is clearly seen in FIG. 2, the wheel will decelerate slightly, but the oscillatory or undulating behavior or the wheel will be eliminated. A very slight overshoot of braking effort may occur, but, since the wheel deceleration is more gradual, the overshoot is, effectively, eliminated, thus eliminating oscillations of wheel speed.

Figure 3:
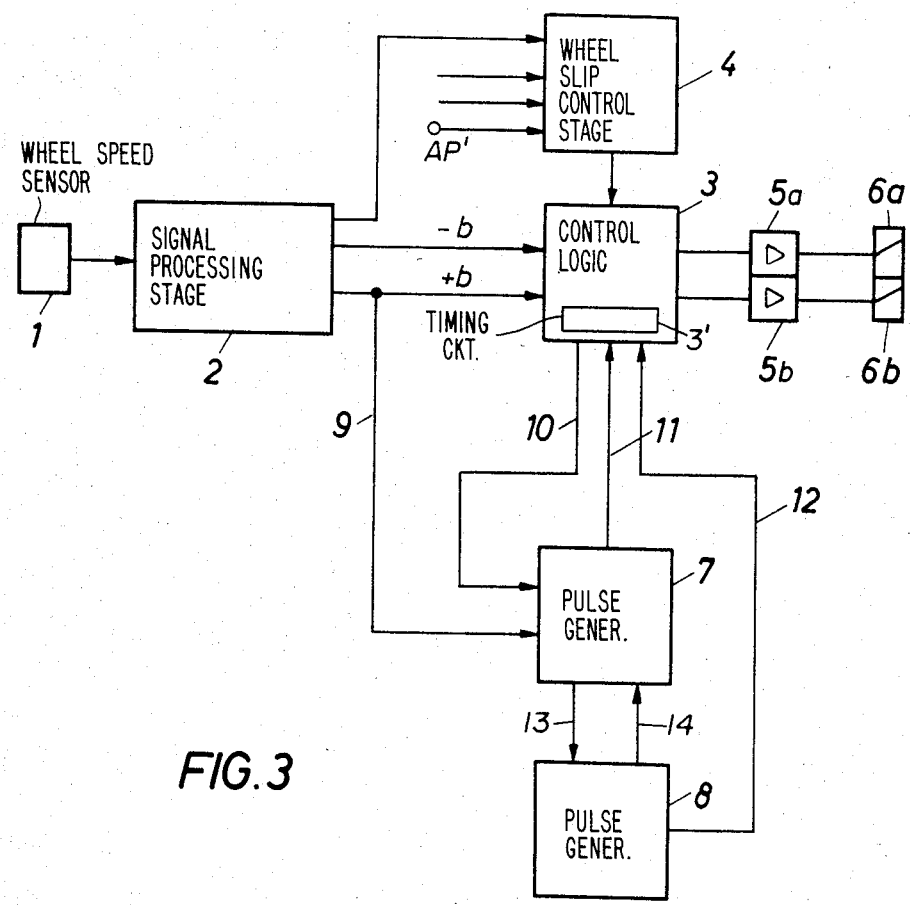
FIG. 3 is a schematic block circuit diagram illustrating an apparatus to carry out the braking sequence, or method, of FIG. 2.

The system to carry out this sequence of steps is shown in FIG. 3, to which reference will now be made. A wheel speed sensor 1, of any suitable and customary construction—see, for example, the referenced patents—is coupled to a signal processing stage 2 in which the wheel speed signals are differentiated and otherwise processed to provide acceleration and deceleration signals $+b$ and $-b$, to be applied to a control logic 3. The control logic 3 is controlled by a wheel slip or brake lock control stage or circuit 4, for example in accordance with the systems described in the referenced patents, to provide a signal to the logic circuit 3 when the wheel speed has a specific relative relationship with respect to calculated or derived reference levels. The logic circuit 3 controls respective amplifiers $5a$, $5b$ which, in turn, control respectively opening and closing of a hydraulic fluid pressure inlet valve $6a$ and a hydraulic fluid pressure drain valve $6b$. If valve $6b$ is closed while valve $6a$ is open, pressure will increase. Upon closing of valve $6a$, the pressure will be maintained; upon opening of valve $6b$, the pressure will drop due to drainage of pressurized fluid from a brake cylinder (not shown).

In accordance with a feature of the invention, two pulse generators 7, 8 are provided which furnish the pulses and pulse gaps $T_2$ and $T_3$, as well as $T_1$ and $T_2$, respectively. The term "pulse generator" is to be considered broadly. The physical structure need not necessarily be a specific pulse generator element, but it may be a suitably programmed microprocessor portion, for example a portion of an integrated microprocessor which includes the stage 2, control logic 3 and the wheel slip control stage 4, and provides, upon suitable recall of a program, pulses as defined above, namely with the pulses and pulse gaps $T_2$, $T_3$ and $T_1$, $T_0$, respectively. Microprocessors which provide pulses of various widths are standard components, the programming of which is well known and likewise standard. Timing is provided by timing circuit $3'$.

Figure 4:
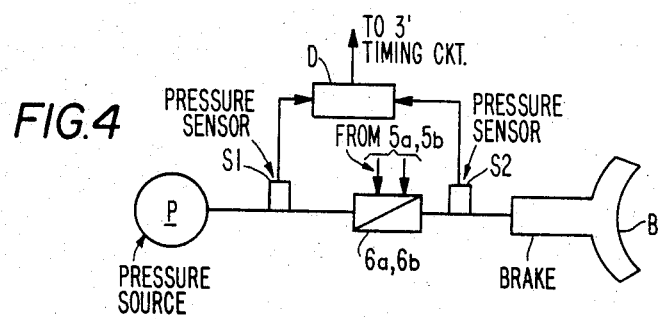
FIG. 4 is a schematic representation of a brake pressure fluid circuit.

FIG. 4, schematically, shows a brake fluid circuit in which a pressure source P provides pressurized brake fluid through the respective valves $6a$, $6b$ (FIG. 3) to a wheel brake B. The delivered pressure is measured by a first pressure sensor S1; the actual braking pressure is measured by a second pressure sensor S2. The differential measured pressure, determined in a differentiator D, is then applied to control the respective timing intervals.

Operation, with reference to FIGS. 2 and 3: Let it be assumed that the operator applies braking pressure, causing the wheel to decelerate from an initial speed value to point I (FIG. 2). If this deceleration is sensed by the wheel slip control stage 4 to be in excess of a predetermined level, wheel braking pressure is then dropped, for example by opening of valve $6b$ and closing of valve $6a$. The wheel speed will still decrease, however, due to inertia effects, until a point II is reached, at which time the wheel speed will again increase. Closing of valve $6b$, with valve $6a$ likewise closed, will then maintain the pressure, causing an increase in wheel speed, to point III.

In accordance with the present invention, and as soon as the acceleration signal which is due to the increase of the wheel speed between points II and III terminates, for example at a given increase rate, or after a predetermined period of time, the pulse generator 7 is activated over control 9 from the signal processing stage 2, to provide, over line 11, a pulse $T_2$, followed by a pulse gap $T_3$, in order to first open the valve $6a$ for a very short period of time, thus resulting in only small increase of pressure, and then keeping both valves $6a$, $6b$ closed to maintain the pressure for a somewhat longer time interval $T_3$. The period of time after the wheel has again accelerated subsequent to deceleration, that is, a predetermined time interval subsequent to point II (see FIG. 2) can be controlled by timing circuit $3'$.

This predetermined time, occurring after termination of the deceleration signal $-b$, derived for example from the control logic, is available to energize the pulse generator 7 over control line 10. Thus, either termination of the acceleration signal $+b$, or a predetermined time after termination of the deceleration signal $-b$, will cause the pulse generator 7 to provide the pulse $T_2$ and the subsequent pulse gap $T_3$.

Upon termination of the time interval $T_3$, the pulse generator 8 is started, which now generates a pulse $T_1$ with subsequent pulse gap $T_0$, which is transferred via line 12 to the control logic 3 to suitably control the amplifiers 5a, 5b and hence the valves 6a, 6b, to first open the pressure inlet valve 6a during time $T_1$, and then close it, with valve 6b closed, to maintain pressure. Termination of the pulse $T_0$ reactivates the pulse generator 7 over line 14. The pulse generator 7, upon being activated over line 14, provides, however, for a longer pulse gap period, so that, rather than the pulse gap $T_3$, a pulse gap $T_4$ will be commanded after the next pressure rise $T_2$. The pulse generator 7, thus, controls, via line 13, the pulse generator 8 and, in turn, is controlled from pulse generator 8 by line 14. Alternatively, of course, a third pulse generator (not shown) may be provided, which has the pulse sequence $T_0$–$T_4$ as the output, rather than a switchable pulse gap time, $T_3$ or $T_4$, as shown. Since the pulse periods and pulse gap or pressure maintenance periods all can be controlled by program command, only the simplest form, with a switchable pulse generator system or arrangement, is shown in the drawings.

The pulse - pulse gap or pulse pause relationships with the time constants $T_2/T_4$ then provides for gradual, slow increase of braking pressure, as shown in the period between points III and IV. If the wheel speed then should decrease too much, suddenly, the pressure can again be dropped after point IV, as shown by the pressure curve P.

Suitable time periods for a hydraulic braking system of a typical mid-size sedan passenger motor vehicle are:

$T_0$: 60 milliseconds
$T_1$: 6 ms
$T_2$: 3 ms
$T_3$: 15 ms
$T_4$: 60 ms.

Various changes and modifications may be made within the scope of the inventive concept.

For example, the difference between then pertaining actual pressure at a brake of a wheel, which is represented by a signal in the control logic 3 or in the wheel slip control stage 4, can be compared with the available pressure from the standard vehicle pressure source. This pressure is connected, for example, to the wheel slip control stage 4 at a terminal AP'. The available pressure curve AP (FIG. 2) deviates from the wheel pressure curve (P) starting at point A. This difference can be used to control the time intervals $T_2$, $T_1$, respectively, and/or also the time intervals $T_3$, $T_4$. Preferably, however, it is used primarily to control the length of the time interval $T_2$ to reliably insure that the wheel will not decelerate too much so that the actual wheel speed curve will be as shown in FIG. 2, and thus closely approach the curve shown in broken lines in FIG. 1.

The respective timing intervals of the brake signals can be sensed in elapsed-time circuits, such as a circuit 3', forming part of the control logic 3, or of any other suitable circuit component of the system.

I claim:

1. In a vehicle braking system, in which the vehicle has
means (1, 2) for providing a signal representative of speed, acceleration and deceleration of a wheel of the vehicle,
means (5a, 5b, 6a, 6b) for applying, selectively, higher or lower braking pressure on the wheel,
and control means (3, 4) responsive to said signals and controlling the braking pressure, in steps or pulses, such that, sequentially, braking pressure pulses of respectively controlled different pressure levels follow each other,
a method of controlling the braking pressure including the steps of
applying braking pressure;
sensing wheel deceleration as the result of applied braking pressure;
determining if said wheel deceleration exceeds a predetermined level, and, if so, inhibiting further increase of braking pressure;
and, thereafter, increasing braking pressure in a further pressure increase phase, wherein, in accordance with the invention, the pressure increase phase comprises the steps of
(a) increasing braking pressure during a first time interval which is short with respect to an oscillation period of the wheel if subjected to a brake pressure increase pulse, so that the braking pressure increase will be small and short;
(b) then maintaining braking pressure for a second interval of time which, also, in short with respect to said oscillation period;
(c) then increasing braking pressure during a third interval of time which is longer than said first time interval;
(d) then maintaining braking pressure during a fourth interval of time which is longer than said third time interval;
and then repeating, alternately, sequentially, the pressure increase step (a) and the pressure maintenance step (d).

2. Method according to claim 1, wherein said pressure increase step (a) occurs after the wheel passes through a predetermined level of rate of change of wheel speed.

3. Method according to claim 1, wherein said step (a) occurs after the wheel has accelerated, subsequent to wheel deceleration, to a predetermined wheel speed value.

4. Method according to claim 1, including the step of determining a time interval after the wheel has decelerated as a consequence of application of braking pressure, and the wheel deceleration has exceeded the predetermined level;
and commanding step (a) to occur after elapse of said time interval.

5. Method according to claim 1, including the step of generating electrical pulses of, respectively, said first, second, third and fourth time intervals, and controlling the respective time intervals by said pulses.

6. Method according to claim 5, wherein the motor vehicle includes at least two pulse generators;
and said step of generating the pulses comprises operating said pulse generator.

7. Method according to claim 1, wherein the vehicle includes a source of braking pressure, including the step of sensing the available pressure of said pressure source;
and controlling at least one of: said first time interval; said third time interval;
as a function of a difference between the sensed pressure of said pressure source and the then pertaining actual braking pressure at the vehicle brake.

8. Method according to claim 7, wherein the at least one time interval is controlled towards decrease of the time interval with increase of the difference between the pressure of the pressure source and the then pertaining braking pressure.

9. Method according to claim 1, further including the step of determining the time interval between initial decrease of braking pressure level (point I) and termination of decrease of braking pressure level (point II);
and controlling at least one of: said first time interval; said third time interval,
as a function of said determined time.

10. A braking system, in which the vehicle has
means (1, 2) for providing a signal representative of speed, acceleration and deceleration of a wheel of the vehicle,
means (5a, 5b, 6a, 6b) for applying, selectively, higher or lower braking pressure on the wheel,
and control means (3, 4) responsive to said signals and controlling the braking pressure, in steps or pulses, such that, sequentially, braking pressure pulses of respectively controlled different pressure levels follow each other, comprising
means for controlling, selectively, application of braking pressure, maintenance of braking pressure, and reduction of braking pressure to the wheel of the vehicle, said control means controlling the selective braking pressure application means for
(a) increasing braking pressure during a first time interval which is short with respect to an oscillation period of the wheel if subjected to a brake pressure increase pulse, so that the braking pressure increase will be small and short;
(b) then maintaining braking pressure for a second interval of time which, also, is short with respect to said oscillation period;
(c) then increasing braking pressure during a third interval of time which is longer than said first time interval;
(d) then maintaining braking pressure during a fourth interval of time which is longer than said third time interval;
and then controlling, alternately, pressure increases as set forth in (a) and (d) above.

11. System according to claim 10, wherein said control means control the first time interval of increased pressure as a function of change in wheel speed rate as respresented by one of said signals.

12. System according to claim 11, wherein said control means is responsive to change in wheel speed change rate with respect to a predetermined threshold level.

13. System according to claim 10, including a timing means providing a timing interval signal after a substantial drop in braking pressure;
and wherein said system provides for increasing the braking pressure during said first interval after elapse of said timing interval as represented by said timing signal.

14. System according to claim 10, including at least two pulse generators (7, 8) providing pulse signals controlling said braking pressure application means (5a, 5b, 6a, 6b), selectively, in accordance with selected ones of said time intervals.

15. System according to claim 14, wherein separate pulse generators are provided for, respectively, providing first and second, and said third time intervals.

16. System according to claim 10, further including means (AP', S2) providing a signal representative of available braking pressure;
and wherein said control means (3, 4) is responsive to the difference between available braking pressure and actual wheel braking pressure, and controls at least the first time interval as a function of said difference in pressures.

17. System according to claim 16, wherein the control means is effective to reduce the time interval with increasing pressure differential.

18. System according to claim 10, further including a timing circuit providing a signal representative of the elapsed time of decreased brake pressure after a first, initial pressure rise;
and said control means (3, 4) is effective to control at least said first time interval as a function of said elapsed time.

19. System according to claim 18, wherein the time interval is decreased upon increase of said elapsed time.

20. System according to claim 10, wherein said first time interval is about 3 milliseconds; said second time interval is about 15 milliseconds; said third time interval is about 6 milliseconds; and said fourth time interval is about 60 milliseconds.

* * * * *